(12) United States Patent
Darling et al.

(10) Patent No.: US 11,596,501 B1
(45) Date of Patent: Mar. 7, 2023

(54) COVER FOR BRACKET OF ORTHODONTIC APPLIANCE

(71) Applicants: Steven Darling, Ocean Ridge, FL (US); Janis Darling, Ocean Ridge, FL (US)

(72) Inventors: Steven Darling, Ocean Ridge, FL (US); Janis Darling, Ocean Ridge, FL (US)

( * ) Notice: Subject to any disclaimer, the term of this patent is extended or adjusted under 35 U.S.C. 154(b) by 0 days.

(21) Appl. No.: 17/462,650

(22) Filed: Aug. 31, 2021

(51) Int. Cl.
*A61C 7/12* (2006.01)
*A44C 15/00* (2006.01)

(52) U.S. Cl.
CPC ............ *A61C 7/125* (2013.01); *A44C 15/007* (2013.01)

(58) Field of Classification Search
CPC .............................. A61C 7/125; A44C 15/007
See application file for complete search history.

(56) References Cited

U.S. PATENT DOCUMENTS

| | | | | |
|---|---|---|---|---|
| 7,134,872 B2* | 11/2006 | Abels | ........................ | A61C 7/28 433/8 |
| 7,204,691 B2* | 4/2007 | Darling | .................. | A61C 7/125 433/11 |
| 10,624,719 B2* | 4/2020 | Darling | ..................... | A61C 7/28 |
| 2003/0008259 A1* | 1/2003 | Kuo | ........................ | A61C 9/0046 433/2 |
| 2010/0129765 A1* | 5/2010 | Mohr | ........................ | A61C 7/12 433/10 |
| 2016/0256241 A1* | 9/2016 | Wigal | ..................... | A61C 7/303 |
| 2017/0007386 A1* | 1/2017 | Mason | .................. | A61C 19/063 |
| 2017/0008333 A1* | 1/2017 | Mason | ..................... | A61C 7/08 |
| 2017/0035532 A1* | 2/2017 | Nguyen | .................... | A61C 7/12 |
| 2017/0086944 A1* | 3/2017 | Hulwi | ..................... | A61C 7/303 |

* cited by examiner

*Primary Examiner* — Ralph A Lewis
(74) *Attorney, Agent, or Firm* — Malloy & Malloy, P.L.; Robert M. Downey

(57) ABSTRACT

A cover device formed of a plastic or similar composition is structured for removable attachment over a bracket of an orthodontic appliance to conceal the bracket from view. The cover device includes a main plate with an outer front face, and top and bottom claws integrally formed with the main plate, curling behind the main plate, and each terminating at distal ends in spaced, opposing relation to each other behind the main plate. The front face includes an ornamental design or other indicia that is applied by polymer fusion technology to significantly reduce the risk of exposing the user to inks and pigment compositions, particularly if the cover device is accidentally swallowed. The application of the indicia by polymer fusion technology also increases the structural integrity of the cover device; mechanically strengthening the cover device at its point of greatest flexure.

8 Claims, 4 Drawing Sheets

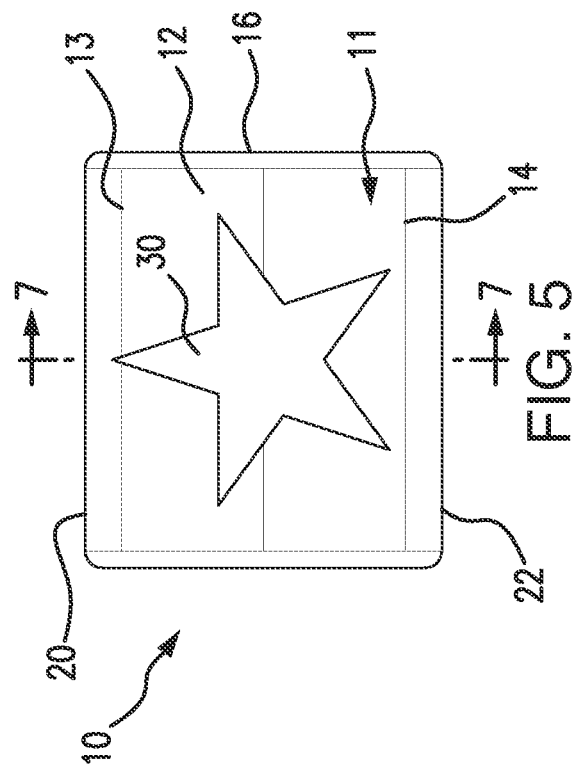
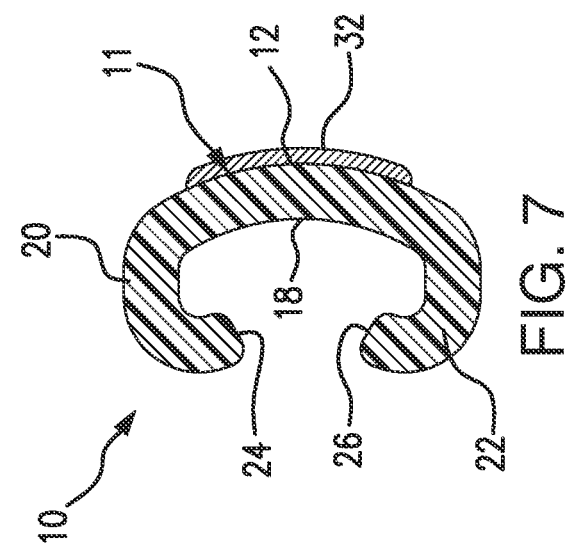
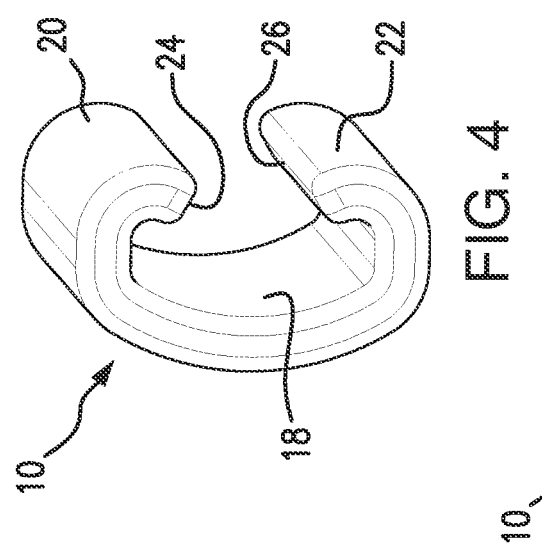
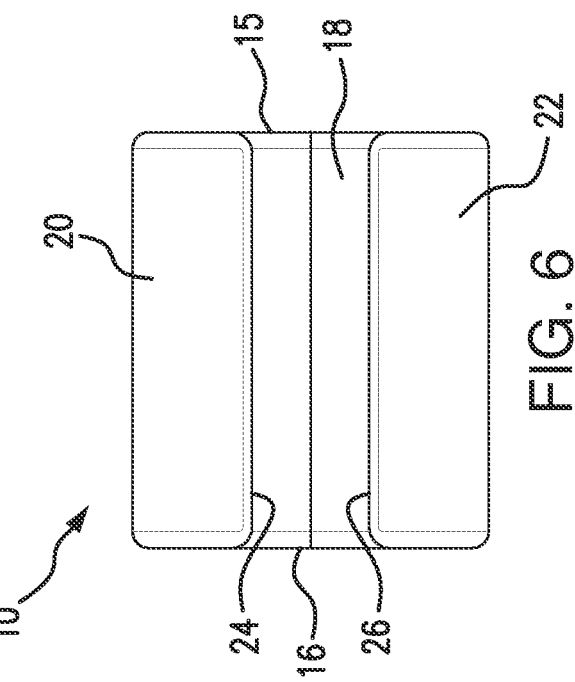

COVER FOR BRACKET OF ORTHODONTIC APPLIANCE

BACKGROUND OF THE INVENTION

Field of the Invention

This invention relates to accessory devices for orthodontic appliances and, more particularly, to a cover device for attachment to individual brackets on a patient's teeth to provide an enhanced appearance of the orthodontic appliance without producing any tractive force on the arch wire.

Discussion of the Related Art

Orthodontic appliances commonly referred to as "dental braces" typically include brackets that are cemented to the outer facing surface of the patient's teeth and an arch wire that is held by the brackets and tightened to provide desired forces for aligning and straightening the patient's teeth. Traditional dental braces use elastic ties (o-ring ligators) that are stretched over and fitted onto the brackets for exerting a continually acting tractive force that urges the arch wire inwardly against the brackets and teeth.

While dental braces are highly effective and still one of the most commonly used orthodontic appliance for straightening and aligning teeth, they are generally unattractive. In particular, many orthodontic patients find the brackets on the exposed face of the teeth to be unappealing and they may even feel embarrassed and reluctant to smile. In an effort to enhance the overall appearance of dental braces, various elastomeric ligation devices have been proposed in the past. Some of these elastomeric ligators include a membrane or outer skin that covers and conceals the bracket from view when the ligator is attached over the bracket. Examples of these types of elastomeric ligators are found in U.S. Pat. No. 3,758,947 to Kissling and U.S. Pat. No. 7,204,691 to Darling et al. These elastomeric ligator devices and other ligation devices that have been proposed in the past exert pressure on the arch wire in order to secure the arch wire to the bracket. The law in most states requires that the operation of securing or unsecuring by attaching or removing a fastening device must be done under a minimum of indirect supervision by a licensed dentist, whereby the licensed dentist must examine the patient, diagnose a condition to be treated, authorize the procedure to be performed and be on the premises while the procedure is being performed by a dental assistant. Accordingly, while the various elastomeric ligation devices proposed in the past have been effective to conceal the generally unsightly bracket of orthodontic appliances, they are not suited to be attached or removed by the patient. Thus, the patient is not able to remove these elastomeric ligation devices each night or when desired, such as when brushing the teeth or simply to remove or interchange different cover devices over the brackets.

A solution to the above noted limitations of elastomeric ligation devices is disclosed in our prior U.S. Pat. No. 10,624,719 entitled COVER FOR BRACKET OF ORTHODONTIC APPLIANCE. More particularly, the cover device disclosed in our prior U.S. Pat. No. 10,624,719 includes a main plate with an outer face, a front face, and top and bottom claws that are integrally formed with the main plate. The top and bottom claws curl behind the main plate and terminate at distal ends in spaced, opposing relation to one another behind the main plate. The main plate of the cover device is bowed outwardly from top to bottom to allow the claws to flex away from each other and snap over the bracket upon application of inward pressure on the front face, while the claws are pressed against the bracket, thereby attaching the cover to the bracket. When the cover is attached to the bracket, the bracket is concealed from view. As disclosed in our prior U.S. Pat. No. 10,624,719, the outer front face of the cover device may include an ornamental design. And, while the specific manner or process of applying the ornamental designs, symbols, shapes and other indicia to the outer front face of the cover bracket was not specifically disclosed in our prior patent, it was contemplated to use various ink application techniques. In particular, the three primary techniques that are often used to prepare plastic surfaces so that ink will tend to adhere to the surfaces are chemical treatment, heat treatment and plasma treatment. These well-known techniques were considered for applying indicia to the front face of the cover device disclosed in our prior patent. And, while the adhesive properties are increased by these various surface preparations, the ink will still tend to come off and dissolve if the cover device is placed in a very acidic environment, such as the stomach. One of the greatest concerns with the decorated orthodontic cover devices relates to the ingestion of inks in the event the cover device is swallowed by the user.

The present invention seeks to overcome the problems and concerns relating to ingestion of inks that are used in the application of ornamental designs, symbols, shapes, colors and other indicia to the outer front face of the orthodontic appliance cover device. In particular, the present invention seeks to greatly mitigate the risk of a person ingesting ink in the event the cover device is accidentally swallowed. Additionally, the present invention seeks to mechanically strengthen the cover device at its point of greatest flexure.

SUMMARY OF THE INVENTION

The present invention is directed to a cover device for attachment over a bracket of an orthodontic appliance and wherein an outer front face of the cover device includes an ornamental design, symbol, shape, logo or other indicia. The cover device is formed of a polyolefin plastic and is specifically sized, structured and configured to be attached over a single bracket, while engaging the undercut of the bracket in order to hold the cover device thereon. Polyolefin plastics are a family of thermoplastics that include polypropylene and polyethylene.

As noted above, the outer front face of the cover device includes an ornamental design, symbol, shape, team logo or other indicia (referred to collectively hereinafter as "indicia"), as desired by the user. According to the present invention, the indicia is applied to the outer front face of the cover device by a polymer fusion application process, wherein a pigmented material is used to create the desired indicia. The pigmented material may be arranged in the desired indicia pattern on a transfer sheet. The pigmented material may be a mixture of finely divided pigment, a wax material and a finely divided polyolefin. The outer front face is coated with a mixture of polyolefin and a binder. Thereafter, the pigmented material, possibly on a transfer sheet, is placed on the outer front face of the cover device and the surface is heated to a temperature sufficient to fuse the coating and pigmented material to the outer front face surface and incorporate the coating and pigmented indicia permanently into the outer front face of the cover device which is also formed of a polyolefin material. The polymer fusion application process uses pigmented polyolefin plastics rather than ink. As a result, the applied indicia is more impervious to acidic environments and will not break down and release from the outer front face as easily as an ink coating. Additionally, the application of the indicia by polymer fusion provides an added layer of polyolefin material to the cover device at its weakest area, namely the midpoint. This increased thickness of polyolefin material at the midpoint provides reinforcement that allows the cover device to resist the forces of permanent mechanical deformation when the cover device is stretched over the bracket.

Objects and Advantages of the Invention

Considering the forgoing, it is a primary object of the present invention to provide a cover device that has indicia on an outer front face, and wherein the cover device is structured and disposed to be attached over a bracket of a dental appliance to conceal the bracket from view and enhance the appearance of the dental appliance while also revealing the indicia on the front face.

It is a further object of the present invention to provide a cover device for removable attachment over the bracket of a dental appliance and wherein an ornamental design, symbol, shape, team logo or other indicia is applied to the front face of the cover device by polymer fusion technology, thereby mitigating the risk of exposure to inks and pigments in the event the cover device is swallowed by the user.

It is a further object of the present invention to provide a cover device for removable attachment over the bracket of a dental appliance and wherein indicia applied to the front face of the cover device by polymer fusion technology provides an added layer of polyolefin material to the front face of the cover device, providing increased thickness at the midpoint of the cover device which reinforces the strength of the cover device and allows the cover device to resist forces of permanent mechanical deformation when it is stretched over the bracket.

It is still a further object of the present invention to provide a cover device for removable attachment over a bracket of an orthodontic appliance to conceal the bracket from view, and wherein the cover device can be attached to the bracket and removed from the bracket by the patient without the need of a dental assistant and/or supervision of a licensed dentist.

It is yet a further object of the present invention to provide a cover device that is specifically designed, structured and disposed for removable attachment over the bracket of a dental appliance by the patient, and wherein the patient can easily remove the cover device from the bracket by simply sliding the cover device laterally to either side of the bracket, with the use of slight force of the fingers, until the top and bottom claws of the cover device clear the prongs of the bracket.

It is still a further object of the present invention to provide a cover device for removable attachment over a bracket of an orthodontic appliance, and wherein the cover device helps to minimize abrasion of the inside tissue of the lips and cheeks within the patient's mouth.

It is still a further object of the present invention to provide a cover device for removable attachment over a bracket of an orthodontic appliance, and wherein the cover device may be provided in a variety of colors to accommodate the needs, desires and personal taste of each patient.

These and other objects and advantages of the present invention are more readily apparent with reference to the accompanying drawings.

BRIEF DESCRIPTION OF THE DRAWINGS

For a fuller understanding of the nature of the present invention, reference should be made to the following detailed description taken in conjunction with the accompanying drawings in which:

FIG. 4 is a rear, side perspective view of the cover device of the present invention, according to one embodiment;

FIG. 5 is a front elevational view of the cover device of FIG. 4 showing a front face of the cover device with an ornamental design thereon;

FIG. 6 is a rear elevational view of the cover device of FIG. 4; and

FIG. 7 is a cross-sectional view taken along the plane of the line indicated by the arrows 7-7 in FIG. 5, and illustrating the additional layer of polyolefin material created by the application of the indicia by the polyfusion technology.

Like reference numerals refer to like parts throughout the several views of the drawings.

DETAILED DESCRIPTION OF THE PREFERRED EMBODIMENTS

Figure 1:
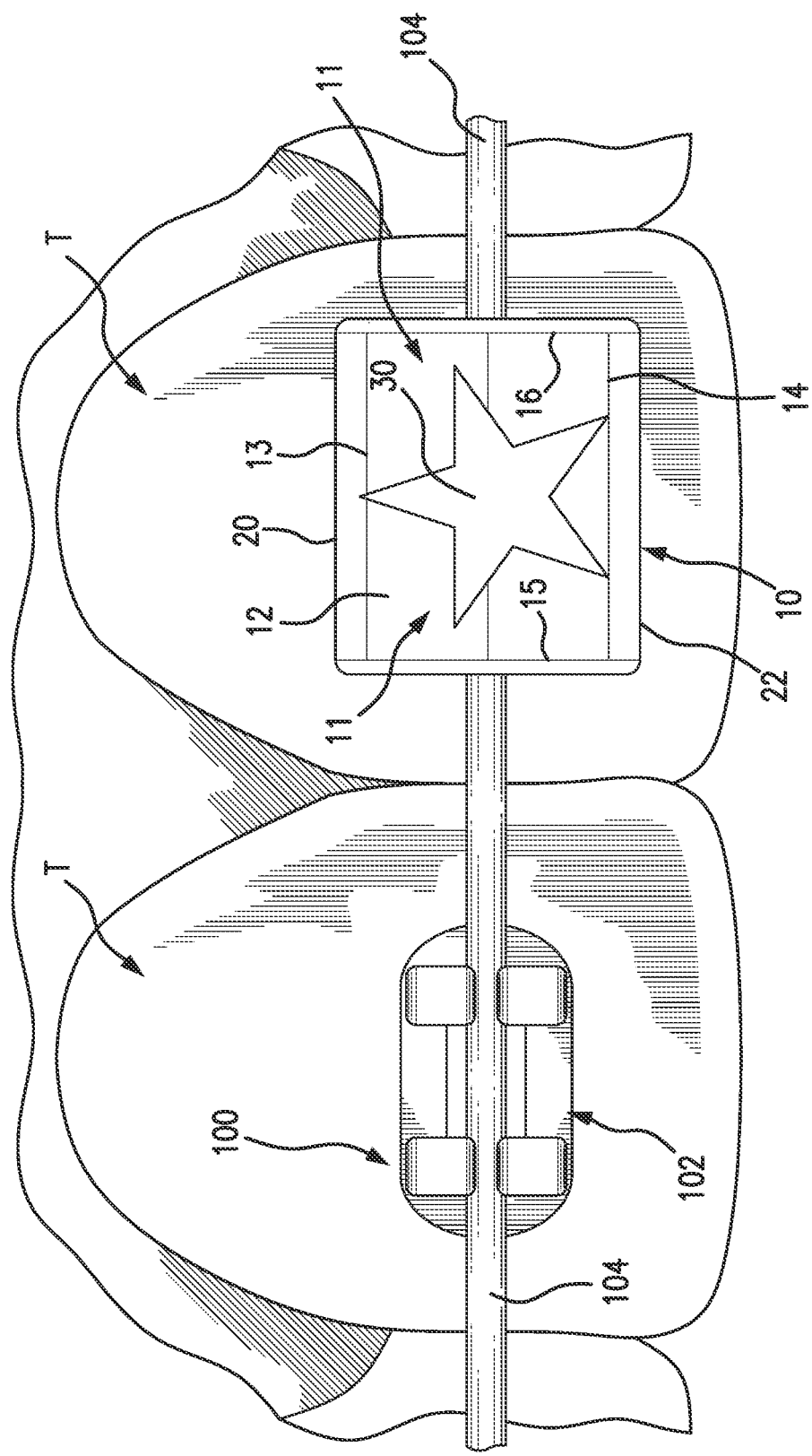
FIG. 1 is an isolated front elevational view showing two incisor teeth of the patient with the orthodontic appliance, including an arch wire and bracket, and further illustrating the cover device of the present invention attached over one of the brackets of the orthodontic appliance.

Referring to FIGS. 1-7, the cover device 10 of the present invention is shown and includes a main plate 11 having an outer front face 12, a top end 13, a bottom end 14, opposite side edges 15, 16 and a rear side 18. A top claw 20 is integrally formed with the main plate 11 and extends from the top end 13 of the main plate and curls back and downwardly behind the main plate, terminating at a distal end 24, as best seen in FIGS. 2A-2B and FIG. 7. A bottom claw 22 is integrally formed with the main plate 11 and extends from the bottom end 14 of the main plate 11 and curls back and upwardly behind the main plate 11, terminating at a distal end 26, so that the distal ends 24, 26 of the upper and lower claws are spaced in opposing relation to one another and spaced from the rear side 18 of the main plate 11, as seen in FIGS. 2A-2B and FIG. 7.

In a preferred embodiment, the cover device 10 is formed of a plastic composition or other similar composition that is generally rigid, but has memory. Thus, the molded material composition can be flexed to deform from a relaxed state upon application of an external force, but seeks to return back to the original relaxed state upon removal of the external force. It should be noted that when fitted to a bracket 102, the cover device 10 does not fully return to the relaxed state so the cover device 10 maintains frictional engagement with the bracket 102 under constant grasping tension, thereby avoiding undesirable movement of the cover device 10 relative to the bracket 102.

Figure 2B:
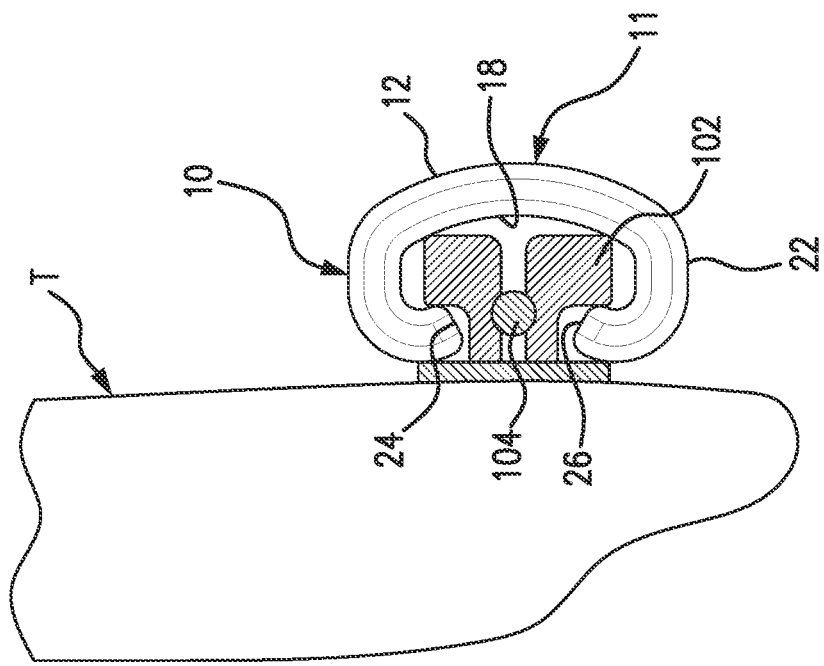
FIGS. 2A-2B illustrate a sequence of snap-fit attachment of the cover device of the present invention over a bracket of the orthodontic appliance.
Figure 2A:
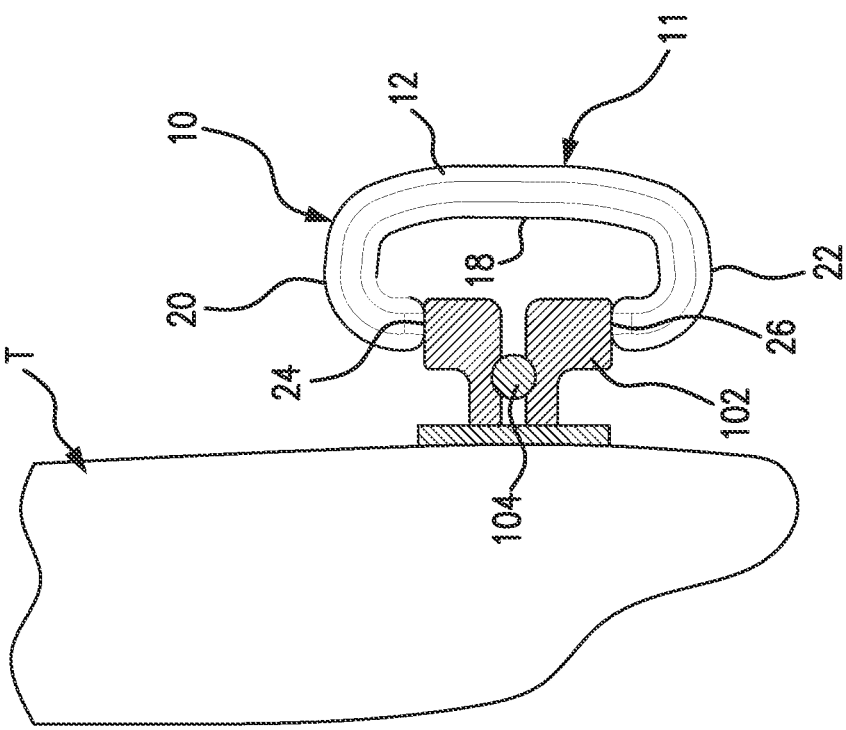

In a preferred embodiment, the main plate is bowed from the top end 13 to the bottom end 14 so that the outer face 12 is generally convex and the rear side 18 is generally concave. The bowed structure of the main plate 11 allows the main plate 10 to be deformed inwardly towards the distal ends 24, 26 of the claws 20, 22 upon application of an external force when the top and bottom claws 20, 22 are pressed against the bracket 102 of the orthodontic appliance 100. More specifically, referring to FIGS. 2A-2B, a sequence of attachment of the cover device 10 is shown wherein the cover device 10 is positioned in front of the bracket and a force is applied to the outer front face 12 of the main plate 11 causing the main plate to flex and deform inwardly. This causes the top and bottom claws 20, 22 to flex away from one another so that the distal ends 24, 26 of the top and bottom claws move further apart from one another. This allows the top claw 20 and the bottom claw 22 to move over and around the bracket 102, as seen in FIG. 2A. Further inward movement of the cover device 10 relative to the bracket, eventually allows the distal ends 24, 26 of the top and bottom claws to close towards one another within an undercut on the back side of the bracket 102 in a snap-fit action. FIG. 2B shows the cover device 10 attached on the bracket 102. When the cover device 10 is attached to the bracket 102, the top claw 20 and the bottom claw 22 have not quite returned to the fully relaxed state, so that the top and bottom claws maintain pressure on the bracket 102, to create frictional engagement between the cover device 10 and the bracket 102. This helps to maintain the cover device 10 on the bracket 102, wherein one or more cover devices 10 on brackets 102 of the dental appliance remain securely attached without undesirable movement or easy dislodgement.

Figure 3:
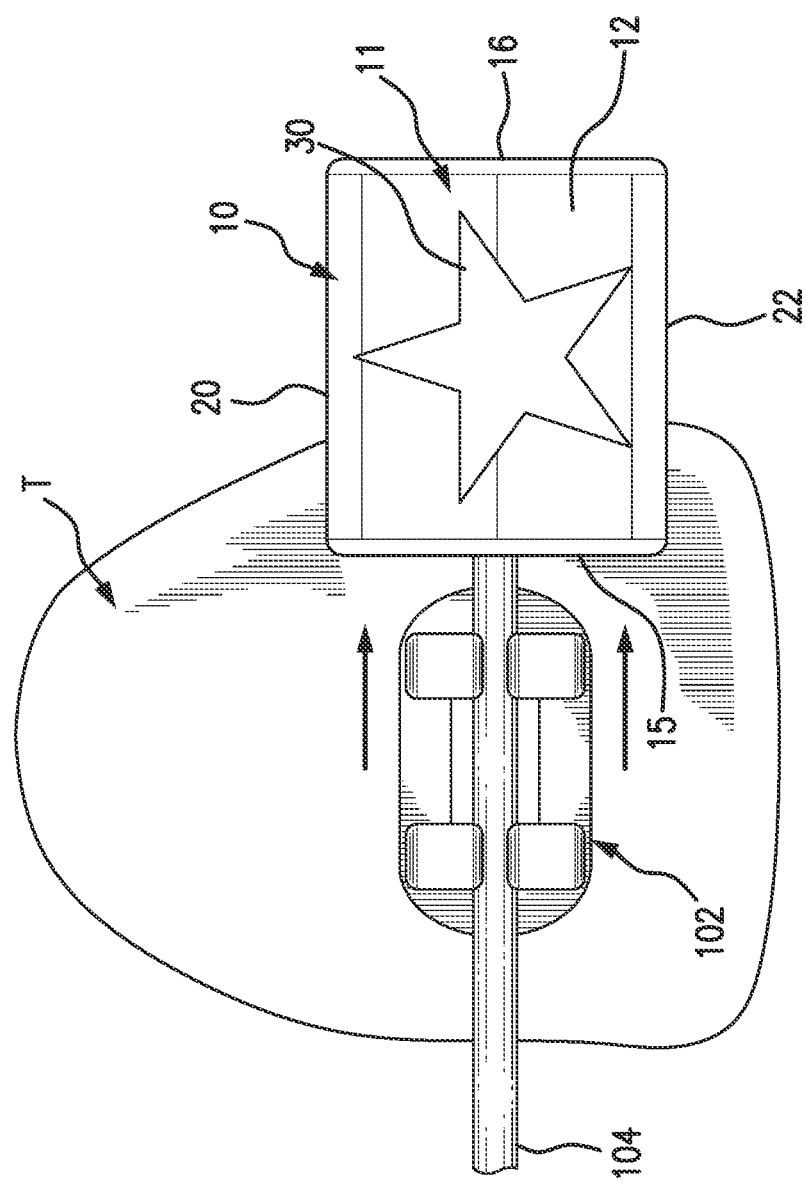
FIG. 3 is an isolated front elevational view of a single tooth illustrating lateral sliding removal of the cover device of the present invention from the bracket of the orthodontic appliance.

As seen in FIGS. 4 and 7, the opposite sides of the cover device 10 are open between the side edges 15, 16 of the main plate 12 and the top and bottom claws 20, 22. The open opposite sides of the cover device 10 are sized and configured to allow passage of the bracket 102 outwardly therethrough upon application of an external lateral force to the cover device 10 that is sufficient to overcome the force of frictional engagement of the top and bottom claws 20, 22 with the bracket 102 and slide the cover device 10 sideways off of the bracket 102, as illustrated in FIG. 3. Once the cover device 10 completely clears the bracket 102, as seen in FIG. 3, the cover device 10 can be simply pulled outwardly away from the arch wire 104 of the dental appliance and removed from the patient's mouth. Because the distance between brackets 102 on adjacent teeth T is greater than the width of the cover device 10, there is ample space between brackets to allow removal of the cover device 10 off of the orthodontic appliance 100, once the cover device 10 has been slid laterally off of the bracket and positioned between brackets on adjacent teeth.

As seen in FIGS. 1, 3 and 5, the front face 12 of the cover device 10 may be provided with an ornamental design, symbol, shape, team logo, or other indicia, 30 as desired by the user/patient. The indicia 30 is applied to the front face 12 of the cover device 10 by polymer fusion technology. More particularly, permanent application of the indicia to the front face surface of the cover device 10 is achieved by applying a pigmented material to the surface in the desired indicia pattern, preferably from a transfer sheet. The pigmented material is a mixture of finely divided pigment, hydrocarbon wax and finely divided polyolefin. The front face surface 12 of the cover device is coated with a coating mixture comprising a mixture of polyolefin and a binder. Thereafter, the transfer sheet with the indicia pattern is placed against the coated front face and the front face and pigmented material is surface heated to a temperature sufficient to fuse the pigmented material in the desired indicia pattern permanently into the front face 12 of the cover device. In order to conform to the convex outer front face surface 12, a soft heated pad is used to heat the pigmented material, surface coating and the outer front face surface to accomplish the polymer fusion of the indicia into the outer front face surface 12. Additionally, each of the cover devices 10 may be supported on the rear side 18, the top end 13, the bottom end 14 as well as possibly on the opposite side edges 15, 16 during the fusion process to prevent distortion of the molded shape of the cover devices 10 when subjected to heat. Referring to FIG. 7, a cross-sectional view of the cover device 10 is shown. As seen in FIG. 7, the applied indicia to the outer front face 12 by the polymer fusion technology provides an additional layer 32 of polyolefin material. This additional layer 32 increases the thickness at the weakest area of the cover device, namely the midpoint halfway between the top end 13 and the bottom end 14. This helps to provide added structural integrity to the cover device 10. More particularly, when the cover device is fitted over the brackets, the cover device flexes at the midpoint. The increased thickness at the midpoint provides reinforcement, which allows the cover device 10 to resist the forces of permanent mechanical deformation when the cover device is stretched over the bracket. As a result, the cover device maintains its structural integrity, resulting in a tighter fit over the orthodontic bracket 102, and thereby increases the overall safety of the use of the cover device 10.

While the present invention has been shown and described in accordance with several preferred and practical embodiments, it is recognized that departures from the instant disclosure are fully contemplated within the spirit and scope of the following claims as interpreted under the Doctrine of Equivalents.

What is claimed is:

1. A cover device for attachment to a bracket that is fixed to a patient's tooth in an orthodontic appliance that has an arch wire extending through the bracket, said cover device comprising:
    a main plate having an outer front face, a top end, a bottom end, opposite side edges and a rear side;
    a top claw integrally formed with the main plate and extending from the top end of the main plate and curling behind the main plate, and a bottom claw integrally formed with the main plate and extending from the bottom end of the main plate and curling behind the main plate, and the top and bottom claws both terminating at distal ends that are positioned in spaced, opposing relation to one another and spaced from the rear side of the main plate;
    the main plate being bowed outwardly from the top end to the bottom end when in a relaxed state, and the main plate being adapted to deform inwardly upon application of an external inward force to the front face with the top and bottom claws engaged against a front side of the bracket to cause the top and bottom claws to flex away from one another and snap over the bracket and into frictional engagement with the bracket, to thereby attach the cover device to the bracket and the cover being structured and configured to avoid contact with the arch wire of the orthodontic appliance when the cover device is attached to the bracket and the main plate is in the relaxed state; and
    an indicia pattern applied to the outer front face by polyfusion wherein the indicia pattern comprises a pigmented material including a finely divided pigment and polyolefin is permanently fused into the outer front face, and the indicia pattern providing an added layer of material thickness to the outer front face of the main plate to increase the structural integrity of the main plate and provide reinforcement that allows the cover device to resist forces of permanent mechanical deformation when the top and bottom claws flex away from one another and snap over the bracket, thereby providing a tighter fit of the cover device on the bracket.

2. The cover device as recited in claim 1 wherein the cover device is open at opposite sides between the opposite side edges and the top and bottom claws.

3. The cover device as recited in claim 2 wherein the open opposite sides of the cover device are sized and configured to allow passage of the bracket outwardly therethrough upon application of an external lateral force to the cover device that is sufficient to overcome a force of frictional engagement of the top and bottom claws with the bracket, to thereby slide the cover device sideways and off of the bracket.

4. A cover device for attachment to a bracket that is fixed to a patient's tooth in an orthodontic appliance, said cover device comprising:
   a main plate having an outer front face, a top end, a bottom end, opposite side edges and a rear side;
   a top claw integrally formed with the main plate and extending from the top end of the main plate and curling behind the main plate, and a bottom claw integrally formed with the main plate and extending from the bottom end of the main plate and curling behind the main plate, and the top and bottom claws both terminating at distal ends that are positioned in spaced, opposing relation to one another and spaced from the rear side of the main plate;
   the top and bottom claws being structured and disposed for snap-fit attachment over the bracket and into frictional engagement with the bracket to thereby attach the cover device to the bracket; and
   an indicia pattern applied to the outer front face by polyfusion wherein the indicia pattern comprises a pigmented material including a finely divided pigment and polyolefin is permanently fused into the outer front face.

5. The cover device as recited in claim 4 wherein the cover device is open at opposite sides between the opposite side edges and the top and bottom claws.

6. The cover device as recited in claim 5 wherein the open opposite sides of the cover device are sized and configured to allow passage of the bracket outwardly therethrough upon application of an external lateral force to the cover device that is sufficient to overcome a force of frictional engagement of the top and bottom claws with the bracket, to thereby slide the cover device sideways and off of the bracket.

7. The cover device as recited in claim 4 further comprising:
   a reinforcement layer on the outer front face of the main plate for providing increased structural integrity that allows the cover device to resist forces of permanent mechanical deformation when the top and bottom claws flex away from one another and snap over the bracket, thereby providing a tighter fit of the cover device on the bracket.

8. The cover device as recited in claim 7 wherein the reinforcement layer is provided by the indicia pattern applied to the outer front face.

* * * * *